Dec. 22, 1959  H. J. KLINE  2,917,932
THERMAL REGULATED MECHANICAL MOVEMENTS
Filed June 2, 1955  3 Sheets-Sheet 1
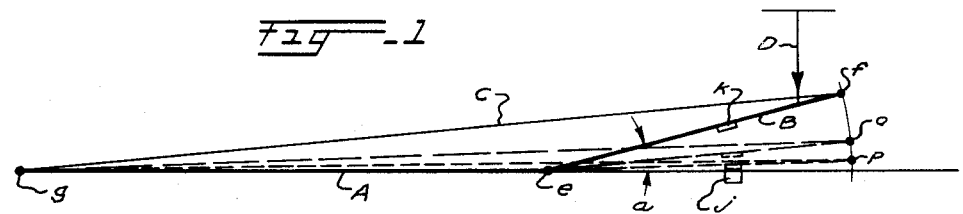
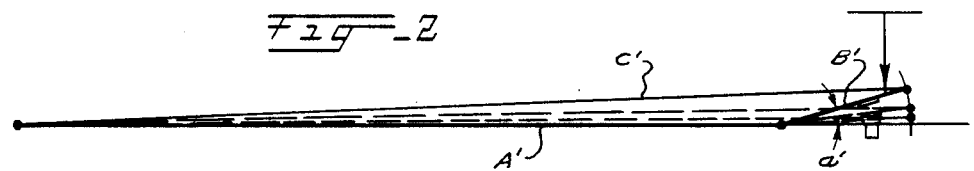
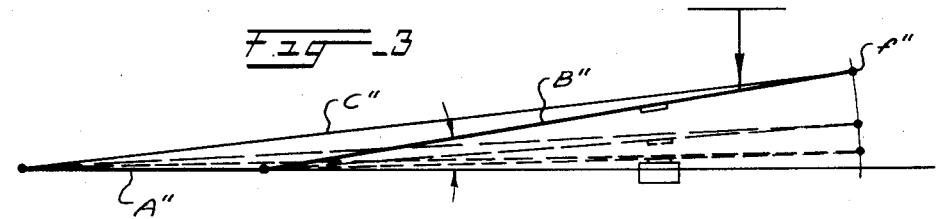
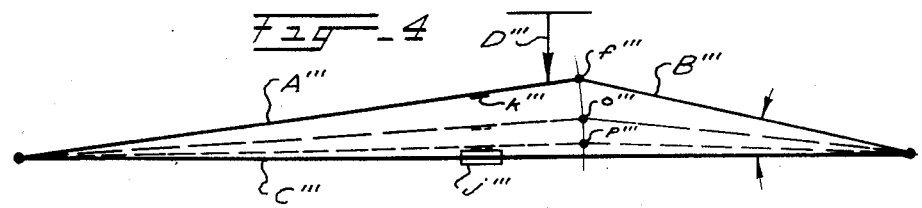
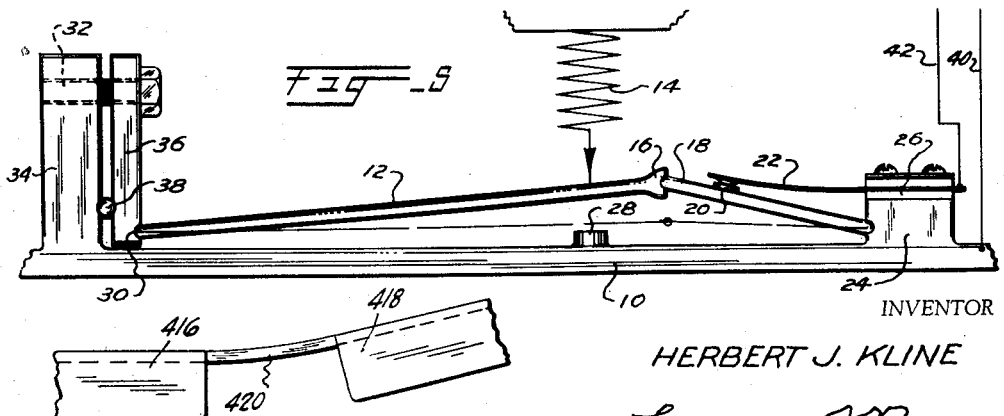
INVENTOR
HERBERT J. KLINE
BY *Townsend F Beaman*
ATTORNEY

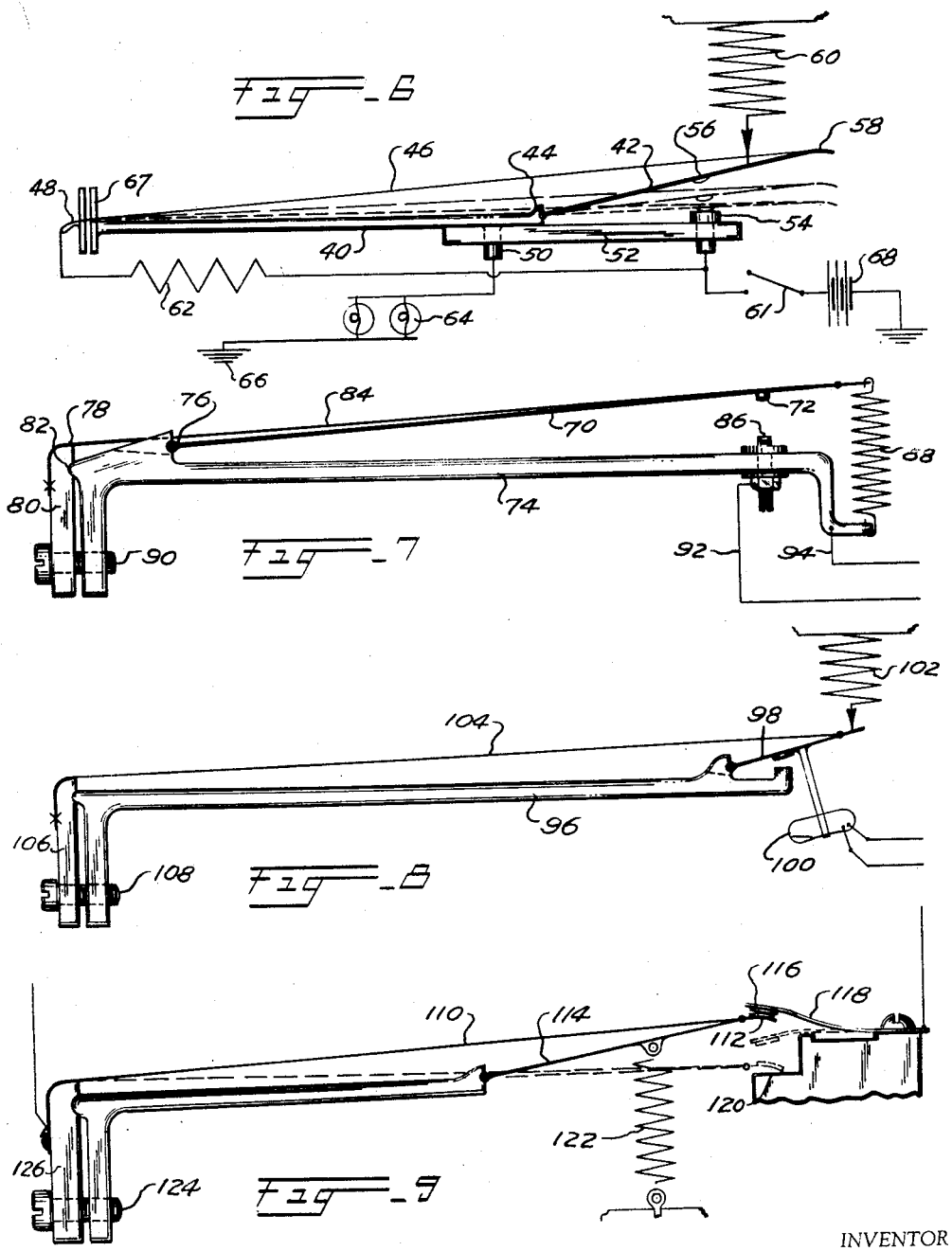

Dec. 22, 1959 H. J. KLINE 2,917,932
THERMAL REGULATED MECHANICAL MOVEMENTS
Filed June 2, 1955 3 Sheets-Sheet 3
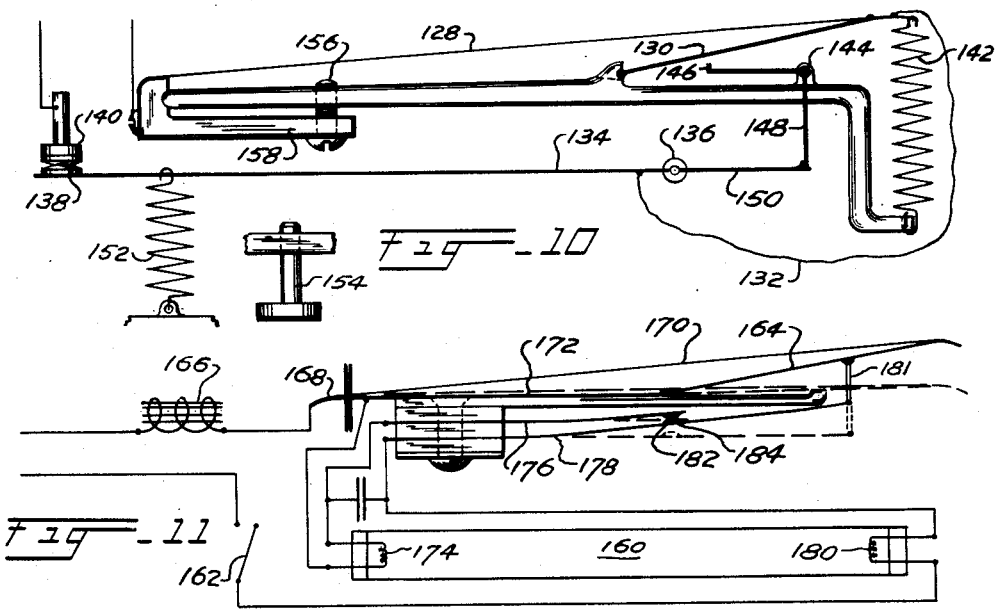
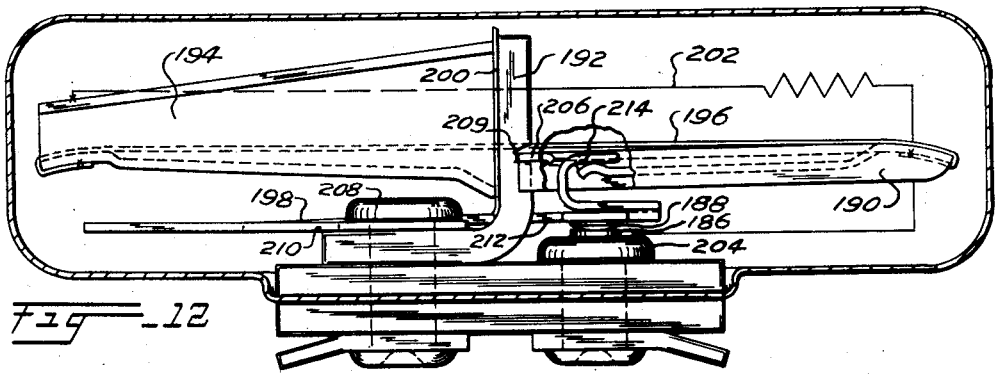
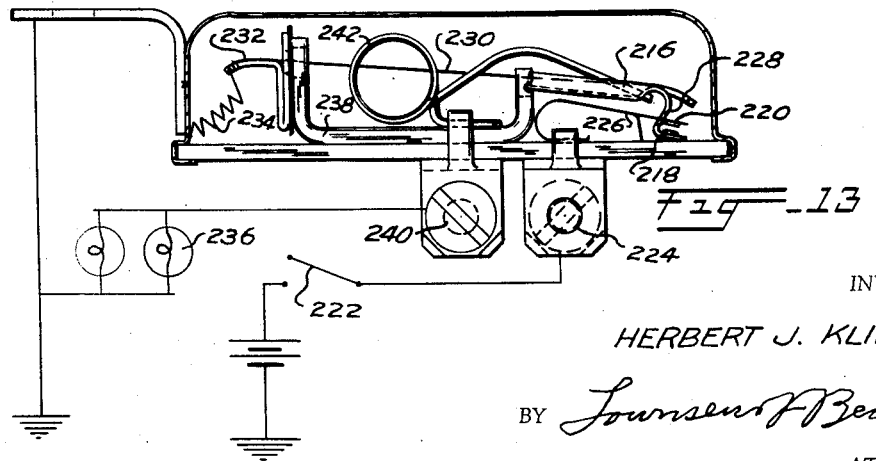
INVENTOR
HERBERT J. KLINE
BY Townsend F. Beaman
ATTORNEY United States Patent Office 2,917,932
Patented Dec. 22, 1959

2,917,932

THERMAL REGULATED MECHANICAL MOVEMENTS

Herbert J. Kline, Jackson, Mich.

Application June 2, 1955, Serial No. 512,675

17 Claims. (Cl. 74—100)

The present invention relates to improvements in snap action mechanisms in which the regulating medium takes the form of an element expanded and/or contracted under variation in temperature, stress or strain conditions or other comparable actuating forces which may be mechanical, electrical, thermal, hygroscopic hydraulical, and pneumatical in nature or a combination thereof.

In basic principle, the mechanism of the present invention is composed of three elements and a relatively constant biasing force. These elements will be usually arranged in what may be termed an obtuse triangle with two of the elements hinged or flexibly connected to each other and to the remaining element. To gain the novel advantages of the invention, the length between the connection points of the longest element approaches, but is stopped from equalling, the combined connected length of the other two elements. The relation between the connected shorter elements to the longest element is that of a toggle joint. The biasing forces may be internally or externally generated.

In practice, one of the elements may be considered as held in a fixed position with the biasing force being applied to the other two elements which may be characterized as the two moving elements. The direction of application of the biasing force is such that the height of the obtuse triangle formed by the elements tends to decrease toward zero with the length of the longest element and the combined connected length of the other two shorter elements approaching equality. With the acute angles between the longest element and the two shorter elements tending to be reduced toward zero by the biasing force, the longest element will be in tension loading and the two shorter elements in compressive loading. Thus, the loading in the elements increases approximately as the cotangent of the acute angle between the longest element and the shortest element. The snap action advantages of the mechanism of the present invention flows from the arrangement of the elements providing the rapid rise and fall of the cotangent values of this acute angle.

Proportional to and in addition to the biasing force acting upon the obtuse triangle arrangement of the elements, as above described, at least one of the elements must be relatively extensible (for the tensile loaded element) or relatively resiliently compressible or contractible (for the compressive loaded elements) in comparison or relation to the other elements.

Generally defined, the operation of my improved mechanism with snap action is such that when actuating or regulating forces permit the relatively constant biasing force to move the elements to a position beyond which the component of the biasing force acting on an element increases faster than the resisting or restraining force developed in that element, then the biasing force will move the movable elements with increasing velocity toward the stopped position. This provides the snap action in one direction of movement, namely, in a direction tending to collapse the triangular arrangement of the elements.

Movement with snap action in the opposite direction takes place under the following conditions; with the biasing force holding the elements in the stopped position, as the actuating forces act to increase the resisting or restraining force in the relatively extensible or relatively compressible element to the point at which it overcomes the component of the biasing force in that elements, then the movable element will move off the stopped position and against the biasing force. Movement from the stopped position will cause a rapid decrease or collapse of the component of the biasing force acting upon the movable element and a correspondingly rapid release of the energy and force stored in the relatively extensible or compressible element by the actuating forces. This combination of decrease of the component of the biasing force and simultaneous release of stored energy derived from the actuating forces provides the snap movement of the movable elements away from the stopped position.

The advantages of snap action mechanism are well appreciated by those skilled in the numerous arts in which rapid movement of mechanism is desirous following control or regulation initiated by relatively slow moving structure. Then the invention has application, for example, in the fields of electrical circuit breakers and makers, electrical relays, thermostats, strain gauges, control actuation in which the expansion and/or contraction of an element under variation in temperature, stress, or strain conditions constitutes the regulating medium.

As its main object, the present invention provides a simplified form of snap action mechanism which may be inexpensively manufactured, readily calibrated and capable of operation without maintenance over extended periods of time.

Another object is to provide a snap action mechanism of the type described in which the elements thereof are arranged as an obtuse triangle with the actuating force being manifested through one of the elements as a physical extension, elongation, expansion, contraction, compression or shortening.

Another object resides in the provision of an improved snap action mechanism having three elements defining an obtuse triangle, two of which are movable and subjected to a biasing force with at least one of the elements being longitudinally relatively extensible and/or contractible under the influence of an actuating force to enable the triangular arrangement to have movement to and from a stopped position.

These and other objects and advantages of the present invention will more fully appear from the following specification and annexed claims.

In the drawings wherein numerous examples of the application of the principles of the invention are diagrammatically shown:

Fig. 1 is a diagrammatic showing of the principles of the invention employing an extensible element, Fig. 2 is a modification of the mechanism of Fig. 1 in which the proportions of the elements of the obtuse triangle have been changed by reducing the length of one of the movable elements, Fig. 3 is a modification of the mechanism of Fig. 1 in which the proportions of the element of the obtuse triangle has been changed from that shown in Fig. 2 by increasing the length of one of the movable elements, Fig. 4 diagrammatically shows the principles of the invention employing a compressible element, Fig. 5 is a modification of the type of the invention shown in Fig. 4, Fig. 6 is a diagrammatic showing of the invention as applied to a normally open contact type of electrical flasher and its circuit, Fig. 7 is a diagrammatic showing of the invention as applied to a thermostat, Fig. 8 is a diagrammatic showing of the invention as applied to a thermostat operating a mercury switch, Fig. 9 is a diagrammatic showing of the invention as applied to an automatic reclosing circuit breaker, Fig. 10 is a diagrammatic showing of the invention as applied to a manual reset circuit breaker, Fig. 11 is a diagrammatic showing of the invention as applied to a starter switch for fluorescent lamps, Fig. 12 is a diagrammatic side-elevational view of a flasher unit constructed according to the invention.

Fig. 13 is a view similar to Fig. 12 of a modified form of flasher unit, and

Fig. 14 is a fragmentary view of a modified form of hinge connection between two elements of the basic triangular arrangement.

The basic principles of operation of the invention may, perhaps, be best understood by reference to the diagrammatic showing in Fig. 1.

The basic arrangement of the elements A, B and C of the snap action mechanism forms an obtuse angled triangle as shown. The elements A and B are relatively heavy and rigid members and are hinged or flexibly joined at $e$. The element C is a relatively light and extensible wire, ribbon or band, hinged or flexibly joined to A at $g$ and to B at $f$.

With the element A held in a fixed position, an approximately constant load D, such as a spring, is applied to the element B as shown. This load puts the element C in a tension loading and the elements A and B in compressive loading. The components of the load D in the elements A, B, C increase as the angle $a$ is decreased toward zero. The element C is extensible both by load and by heat.

When heat is applied the element C by passing an electric current through it, or otherwise heating it, it will expand in length thereby allowing the element B under load to drop lower. This lowering of the element B will decrease the angle $a$ and thereby increase the component of the load D in the element C, causing an extension thereof, which in turn causes a further lowering of the element B. This process will continue until, at a given temperature, the restraining force in the element C establishes equilibrium by balancing the component of the load D in the element C.

However, if the heating of the element C is continued, the element B will fall still further until $f$ coincides with the position $o$, at which point the component of the load in element C will be greater than the restraining force that can be developed in the element C. This results in the element B falling still further and with increased velocity until the stop $k$ on the element B hits the stop $j$, and the point $f$ coincides with the point $p$ which is at some small distance above the straight line extension of the element A. This last movement of the element B occurs very rapidly and constitutes a snap action movement.

With the stop $k$ against the stop $j$, if the element C is allowed to cool it will contract, its length will shorten and the restraining force or pull developed in it will increase to the point where it is greater than the component of the load D in the element C. When this point is reached the element C will lift the element B off and up from the stop $j$ with rapidly increasing velocity. This increased velocity being due to the very rapid decrease in the value of the component of the load D in C as B rises. This causes a further shortening of the element C with a still further and faster rise of the element B. Thus, the point $f$ which had coincided with the position $p$ will move with a snap action movement to the position $o$ and beyond. Therefore, it can be seen that the up and down movement of the element B between the positions $o$ and $p$ is a snap action movement. This snap action occurs at the small values of the angle $a$, usually of less than ten degrees. The snap action range of movement is usually even smaller, being on the order of one to five degrees, depending on the design of the device and the results desired.

The size and the proportional arrangement of the elements A, B, C may be varied over a wide range to obtain the design and functional results desired. As an example, the element A may be made the same length as element B, or many times shorter, or again many times longer than the element B. The basic inherent snap acting movement will be found common to any proportional arrangement wherein the elements are arranged in an obtuse triangle with small values of the angle $a$, and with the element C the tension member and its length approaching but never quite equalling the combined length of the compression members A and B. The load D will always be applied to the moving members so that the element C will be in tension loading and elements A and B in compression loading. The stop $j$ must be so positioned so as to prevent the element B, biased by the load D, from taking a position at or below, what, in effect, would be a straight line extension of the element A. Usually two of the elements will be relatively rigid and the third, in relation to the load applied, will be relatively extensible or compressible as the particular application requires.

In Fig. 2 is shown a modified arrangement of Fig. 1 in which A′ is many times greater than B′. The advantage of this arrangement lies in that for a given percentage expansion of the element C′, a very much greater angular $a'$ snap movement of the element B′ will be effected than could be otherwise obtained. And, conversely, for a very small temperature rise or extension of the element C′, a snap action movement of the element B′ will be effected and can be used for control purposes. If the element C′ is many times the length of the element B′ it is quite obvious that it will require but a very small temperature rise in C′ to obtain a usable movement in the element B′. This arrangement can be very effectively used in thermostat designs.

Fig. 3 shows a modification of Fig. 1 in which the elements A″ and B″ are in a different proportional arrangement to the element C″. The fixed position element A″ is made much shorter than the movable element B″. The long length of the element B″ means that the moving end $f''$ will traverse a much greater distance during the snap action movement. This will provide a greater contact separation for the interruption of higher voltage and current values. Such an arrangement will be particularly useful in the design of many types of relays, contactors, circuit breakers and some types of thermostats.

Fig. 4 shows a substantial rearrangement of the basic elements of Fig. 1 in which the element C‴ is now the fixed and relatively rigid member, although it is still the tension member. The elements A‴ and B‴ are now the moving elements and the load D‴ is applied as shown, to either one so that they also are still in compressive loading. One of these two elements is made relatively rigid and the other relatively resiliently compressible in relation to the load.

The operation of the snap action mechanism is similar to that of Fig. 1. With the element A‴ made relatively rigid and the element B‴ relatively resiliently compressible, then when the element C‴ is increased in length by thermal or mechanical forces, the load D‴ will push the elements A‴ and B‴ down. The force component of the load in these elements will increase rapidly as they move downward. The elements A‴ and C‴ being relatively rigid, the deformation due to the increased component forces of the load D‴ will be all concentrated in the relatively resiliently compressible element B‴. Therefore, the element B‴ will compress and shorten in length and in doing so will allow the load D‴ to push the elements A‴ and B‴ down still further, thereby causing another shortening of the element B‴. This will continue until the restraining force developed by compressing the element B‴ equalizes or balances the force component of the load in B‴.

If the element C‴ continues to lengthen, the load D‴ will continue to push the elements A‴ and B‴ down until the point f‴ coincides with the position o‴, at which point the force component of the load D‴ will be greater than the restraining force that can be developed in B‴ and both elements A‴ and B‴ will fall quickly with a snap action to the position p‴. The stops k‴ and j‴ on the elements A‴ and C‴ will come together at this position and prevent further downward movement.

If, from the position just described, the element C‴ begins to shorten and continues to decrease in length, it will develop the restraining force in the element B‴ to the point where it is greater than the force component of the load D‴. When this point is reached the restraining force will lift the elements A‴ and B‴ off the stop j‴ and move them with a snap action from the position p‴ to o‴ and beyond. This snap action is due to the rapid decrease of the force component of the load D‴ in the elements A‴ and B‴ as they rise, the simultaneous reduction of the restraining force and the subsequent lengthening of the element B‴.

Thus, as the element C‴ lengthens and shortens the elements A‴ and B‴ will move with a snap action down and up at predetermined points under a given load. These snap action movements can readily be used for control purposes. The arrangement is well adapted for use on rigid machine components which undergo dimensional changes due to mechanical forces, thermal forces, hydraulic forces or combinations thereof.

It will be understood that the element B‴ is diagrammatically shown as a compressible member or the member in which is concentrated the majority of the strain or deformation in the device due to the load force. In practice it may be of the same size, shape and material as the other movable member but of a much smaller cross sectional area, or it may be composed of two rigid parts separated by a thin resilient shim. Also it may take any other form or shape such that the elastic strain or deformation developed in it by the load force will, in correlation with the actuating force and deformation, produce the snap action movement desired.

In Fig. 5 the basic principles of Fig. 4 are shown in one commercial form of the invention. The base 10 is the fixed and very rigid member, and is subject to the forces that extend and contract it is length. It may be a part of a machine component that is subject to changes in tension loading or a tank of liquid subject to temperature changes. It is the tension member of the device and its change in length which initiates the snap action movements of the device.

The longer compressive member 12 is also made very rigid and the point of application of the spring load 14 is made near its hinge point 16 with the resiliently compressive member 18. The resilient member carries the moving contact 20 which engages the contact finger 22 mounted on the base end-block 24 in the manner shown and insulated therefrom by the member 26. The stop 28 limits the downward movement of the compressive member 12 about its point 30 and, therefore, all the moving parts.

The point of extension in length of the base 10 at which the snap action movement is initiated, is adjustable by means of the adjustment screw 32 in the end block 34 acting against the member 36 mounted on the fulcrum 38. Electrical leads 40 and 42 connect the contact 20 and finger 22.

With this arrangement of the device a wide range of circuit requirements of contact pressure and gap can be met by correlating the load spring and the resilient member together with the maximum allowable extension differential.

Fig. 6 shows the invention in an elementary design as applied to a low voltage single wire flasher of the normally open contacts type and its electric circuit. The fixed base member 40 is fashioned to receive the hinged end of the flipper 42 at 44, and the shim insulated wire anchorage 48 to 67. The fixed base member 40 has a terminal 50 and also holds an insulated sub-base 52 which supports and positions the fixed electrical contact which also act as a stop.

The flipper, carrying the moving contact 56, is hinged to the fixed base member 40 at 44 and its outer movable end 58 is attached to the extensible wire member 46 as shown. The flipper 42 is biased by the spring load 60, as shown, so as to effect a tension loading in the wire 46 and a compressive loading in the flipper 42 and the fixed base member 40.

When the switch 61 is closed the electric circuit flows through the resistance 62 to the insulated anchorage 48, through the extensible wire member 46 to the flipper 42, the fixed base member 40, through the lamps 64 to the ground 66 and to the battery 68.

The electric current in passing through the extensible wire member 46 heats it and it increases in length. As it is heated the flipper 42 moves down until it reaches a point from which it moves rapidly with a snap action movement until its contact 56 closes with the fixed contact 54. This shunts out the extensible wire member 46 and passes the electric current directly through the flipper 42, fixed base member 40, lamps 64, etc. The lamps 64 will now burn bright.

The electric current being shunted from it, the extensible wire member 46 will now cool, and in doing so it will develop a force or pull in opposition to the component in it of the spring load 60. When it cools sufficiently the wire member 46 will develop a pull that will lift the flipper 42 up with a snap action movement, separate the contacts 54 and 56, and reestablish the electric current through the extensible wire member 46. The lamps will then be dimmed. This cycle of make and break of the contacts 54 and 56, resulting in the lamps being dim and bright, will continue during the period the switch 61 is closed.

It should be noted that the shim insulation 63 not only separates electrically the fixed base member 40 and the anchorage 48 for the extensible wire member 46 but also serves as an adjustment for determining the period the contacts are closed by the insertion of shims of different thickness.

In Fig. 7 is shown an arrangement of the elements of the invention for use as a thermostat. In this arrangement the flipper 70 is made long and rigid and carries the moving contact 72. It is many times longer than the distance on the base 74 from the hinge point 76 of the flipper 70 to the point 78 on the adjustment arm 80 which is rocked around the fulcrum 82 to tension the wire or band 84. On the other end of the base 74 is an insulated contact 86 and the load spring 88 for biasing the flipper. The adjustment screw 90 determines the temperature at which the snap action movement occurs. The advantage of this arrangement is that for small temperature differentials a wide contact separation can be obtained. This is very advantageous in many circuits where high values of current and voltage are interrupted. When the contacts 72 and 86 are engaged the circuit is completed through the leads 92 and 94. The band 84 is of a material having a higher coefficient of expansion than the elements 70 and 74.

Fig. 8 shows a simple basic arrangement of the invention for use as a thermostat to operate a mercury switch. The base 96 is the fixed member and is made many times the length of the flipper 98 which holds the mercury switch 100. The load 102 is applied to the moving end of the flipper and may be a spring or a weight. The band or wire 104 is the third element of the arrangement and is attached to the outer end of the flipper 98 and the adjustment arm 106 of the base 96. The base 96 and flipper 98 are made of low expansion alloy and the band 104 is made of high expansion alloy. The snap action movement can be set for a predetermined temperature by the adjustment screw 108.

The high ratio of the length of the base to the flipper 98 serves to multiply the temperature effect on the band 104. This proportional arrangement is used to obtain a greater snap action movement than could be otherwise obtained for any given small temperature differential.

This same arrangement, with the mercury switch replaced by a pair of contacts, can be used in a great many thermostat applications where a snap action movement of the contacts is desirable but without wide contact separation.

Fig. 9 shows the invention as applied to an automatic reclosing circuit breaker and under certain conditions a flasher of the normally closed contacts type. The line current passes through the band 110, which is the tension and extensible member of the device, to the contact 112 on the moving end of the flipper 114, thence to the mating contact 116 mounted on the finger strip 118 and to the terminal and line as shown. In operation, when the current reaches a predetermined value the flipper 114 will be snapped down to the stop 120 by the load spring 122, the contacts 112 and 116 separated and the circuit broken. After the band 110 has cooled sufficiently it will snap the flipper 114 up, engaging the contacts 112 and 116, and reestablishing the circuit.

The base 118, flipper 114 and band 110 are all made of the same material, are all subject to the same temperature coefficient. Therefore for any given temperature change they will all expand and contract proportionally alike, hold the same position relative to each other, be subject to the same mechanical loads and forces and leave the device, as a whole, unaffected. Thus by making the parts of the same material the effects of ambient temperature changes are nullified. The adjustment screw 124 mounted in the insulated arm 126 provides the means of establishing a definite current value at which the device will trip and the circuit will be broken. The size and proportions of the device determine its current carrying and interrupting capacity.

This type of automatic reclosing circuit breaker may also be used as a flasher of the normally closed contacts type. In this flasher the full current of the lamp load is passed thru the device and after a short interval of time it breaks the circuit, and the lamps go out, then after a short cooling period it snaps the contacts closed, remaking the circuit and relighting the lamps.

For a given lamp load, a wire or band 110 of the proper heating and cooling characteristics is required for the device.

This type of flasher has the advantage of starting the flashing cycle with the lamps on bright which is desirable in many cases.

Fig. 10 shows the invention in an elementary arrangement as applied to a manual reset circuit breaker. The device operates a latch which releases the circuit breaker arm and opens the circuit.

In operation the line current flows through the band 128, which is the tension and extensible member of the device, to the end of the flipper 130, through the pig tail connector 132, through the breaker arm 134, pivoted at 136, and contact 138, through the fixed contact 140 and terminal, and to the line.

As the current flows through the band 128 and rises toward a predetermined value, the band 128 heats, extends in length and allows the load spring 142 to pull the flipper 130 down toward a predetermined point from which it will move downward with a snap action movement. When this predetermined value of current is reached the flipper 130 will move down with a snap action to the bottom stop 144. Just before it reaches the stop 144 it will engage the actuating end 146 of the bellcrank latch 148, pushing the latch off the latch end 150 of the breaker arm 134 and allowing the retractile spring 152 to pull the arm 130 downward, to separate the contacts 138 and 140 and open the circuit.

When the band 128 cools it will snap the flipper 130 up and allow the circuit breaker arm 134 to be relatched by pushing it up with the reset button 154. The adjustment screw 156 in the insulating arm 158 enables the device to be set at a predetermined current value.

An advantage of using the device to operate the latch 148 as the release or tripping mechanism, is that it is fast and complete. The circuit breaker mechanism is either fully latched or released. Up to the value of the current that will trip the device the circuit breaker mechanism remains fully latched. In tripping the latch moves in one quick, fast snap action from the fully latched to the fully unlatched position. This is advantageous in circuit breakers of high current carrying capacity.

Fig. 11 shows an elementary form of the device as a time delay switch for use as a starter in a fluorescent lamp circuit. The device is used to separate a pair of contacts after a short time delay, the result of which is to start the fluorescent lamp 160.

Before the manual switch 162 is closed the device is in the position shown by the solid lines in the sketch. After the manual switch 162 is closed, the flipper 164 is snapped down and stays in the position shown by the dotted lines while the lamp 160 is lighted.

There are two phases of operation and two circuits—the starting phase and the lighted phase. In the starting phase the current flows thru the ballast 166, to the insulated anchorage 168 thru the .008" wire 170, thru the flipper 164 and base 172, to and thru the filamentary electrode 174 at one end of the fluorescent lamp 160, to the upper spring contact 176, thru the load spring and contact finger 178, to and thru the filamentary electrode 180 at the other end of the fluorescent lamp 160, to the manual switch 162 and the line. The current flowing in the starting phase is called the preheat current and is larger in value than the current flowing in the second or lighted phase. It serves to heat the filamentary electrodes 174 and 180 in each end of the fluorescent lamp. It also, in this case, heats the wire 170 sufficiently in a short period of time to allow the load spring 178 to snap the flipper 164 down through the insulated connector 181 and separate the contacts 182 and 184. When the contacts 182 and 184 open, the ballast 166 sends a high voltage surge across the filamentary electrodes 174 and 180 in the fluorescent lamp 160 and the lamp lights.

The operation is now in the second or lighted phase and the current flows thru the ballast 166, the wire 170, the flipper 164 and base 172, to and across the filamentary electrodes 174 and 180 in the lamp 160 to the manual switch 162 and the line. The current flow in this phase is less than the preheat current but in flowing thru the wire 170 is adequate to heat the wire 170 so that the load spring 178 holds the flipper down in the dotted line position with the contacts 182 and 184 open. The switch will remain in this position as long as the lamp is lighted.

The advantage of using this device as a fluorescent starter is that it operates with a snap action, dissipates less current heat, and operates on lower voltages than the gaseous types, and is capable of satisfactory operation for several million starts.

Fig. 12 shows a side elevation view of the device in a more practical form of a normally open contacts type flasher for a 6 or 12 volt lamp circuit. It is shown in the position it would be in when cooling or ready to cool with the contacts 186 and 188 closed. The flipper 190 corresponds to the element B in the schematic sketch of Fig. 1, the base support 192 and rigid stationary anchorage 194 corresponding to the element A and the .008" dia. wire 196 being the element C. The load is applied to the flipper 190 by the flat spring 198 as shown, and the contacts 186 and 188 correspond to the stops K and J shown in the schematic diagram. A thin piece of paper or other insulation 200 is placed between the base support 192 and the stationary anchorage 194 so that the electric current can be made to pass thru the wire 196. A length of resistance wire 202 also connects the stationary anchorage 194 with the terminal rivet 204 holding the fixed contact 186. This wire completes the circuit and also serves to control the rate of heating.

The matching faces of the base support 192 and the stationary anchorage 194 on opposite side of the insulation 200 are at a small angle, from a right angle to the flipper and the center line of the device. Where these faces come together, serves as the one point of adjustment for the device. The stationary anchorage 194 is movable both up and down and to either side to effect the desired timing cycle. It is held permanently in place with adhesive cement.

The bearing between the end 206 of the flipper and the notch 209 of the base support 192 is of the rocker bearing type.

The flat spring 198 is in the form of a G with the rivet 208 holding the end portion 210 against the base support 192. At the other end portion 212 the contact 188 is carried. The finger hook connection 214 connects the portion 212 to the flipper 190. The finger hook connection 214 to the flipper 190 as shown in the cut away portion of the sketch is made with a further slight spring action so as to absorb any tendency of the contact 188 to bounce when it strikes the stationary contact 186. Also, when the contacts 186 and 188 are closed, the flat spring 198 shunts the circuit thru the wire 196 and carries the electric current directly between the terminal rivets 208 and 204.

The device is made to operate at 85 flashes per minute carrying two 21 candle power lamps or 6 amperes at 6 volts. The .008 dia. stainless steel wire 196 will operate between the temperatures of 200° to 385° F. and at a maximum stress of 75000 pounds per square inch. The pressure between the contacts 186 and 188 will be in excess of 2 oz. and the load spring will exert a force of 8 oz. All the metal parts, except the contacts 186 and 188 may be made of steel. The terminal rivets 204 and 208 may be of any suitable type desired.

Fig. 13 shows a side elevation view of the invention in the form of a normally closed contacts type of flasher and its circuit. In operation, the movement of the flipper 216 breaks the circuit and then makes it again, acting as a circuit breaker and maker.

In the drawing of the device as shown, the flipper 216 is down in the cooling position and the contacts 218 and 220 are open. The next move of the flipper 216 is a snap movement upward closing the contacts.

In the starting position the flipper 216 is up and the contacts 218 and 220 are closed. In this position the manual switch 222 is closed and the current flows thru the terminal 224, the leaf spring 226 and contact 220, the flipper contact 218 and end 228, the .007" wire 230 and anchorage 232, the resistance timing wire 234 and to the ground. The current also flows in the parallel lamp circuit 236 with the current flow being from the flipper contact 218, thru the flipper 216, the support 238, the terminal 240, the lamps 236 and to the ground.

As long as the flipper 216 is up, the current flows in both the lamp and heating circuits and the lamps burn bright. When the flipper 216, biased by the torsion spring 242, snaps down to the cooling position, it opens the contacts 218 and 220 and breaks the circuit and the lamps go out.

The advantage of this normally closed contacts type of flasher is that as soon as the manual switch is closed the lamps immediately burn bright.

An advantage of the separate heating circuit is that with a constant voltage the rate of flashing remains relatively constant regardless of the number of lamps in the circuit. This is very desirable in some cases.

In Fig. 14 is shown a modified arrangement wherein the biasing force upon the moving elements of the obtuse triangular arrangement basically disclosed in Fig. 1 to 4, inclusive, for example, is disclosed as an internal force embodied in the hinge connection in lieu of an external force. Referring to the illustrated example, the element 416 corresponds to the element A of Fig. 1 and the element 418 corresponds to the element B. In lieu of the pivot e of Fig. 1, the hinge connection between elements 416 and 418 takes the form of a leaf spring portion 420 in which the biasing force corresponding to the external force or load D of Fig. 1 is internally generated upon deflection.

I claim:

1. A mechanical movement for control or regulation purposes comprising three members having an obtuse triangular arrangement, at least two of said members being angularly movable to control or regulate, at least one of said members being longitudinally extensible or contractible under directly applied conditions of control or regulation of an actuating force, and continuously acting means constituting a biasing force applied to at least one of said movable members.

2. A mechanical movement as defined in claim 1 wherein said biasing force is externally applied.

3. A mechanical movement as defined in claim 1 wherein said biasing force is internally generated in a connection between two of said members.

4. A mechanical movement as defined in claim 1 wherein stop means are provided to restrict the movement of said angularly movable members into the plane of the remaining member upon longitudinal extension or contraction of one of said members, wherein said biasing force on the movable members accelerates the movement thereof as said stop means is approached, and said actuating force under certain conditions of control or regulation accelerates the movement of said members upon movement in the opposite direction relative to said stop means.

5. A mechanical movement as defined in claim 1 wherein said members have hinge like connections with each other.

6. A mechanical movement as defined in claim 4 wherein at least one of said member has resilient properties to assist in the acceleration of said movable members relative to said stop means.

7. A mechanical movement as defined in claim 4 wherein said biasing force holds said movable members relative to said stop means when said actuating force under certain conditions of control or regulation is exceeded by said biasing force.

8. A mechanical movement as defined in claim 10 wherein said metallic element is in the form of a loop.

9. A mechanical movement for control or regulation purposes comprising three members having an obtuse triangular arrangement, at least two of said members being angularly movable to control or regulate, at least one of said members being longitudinally extensible or contractible under conditions of control or regulation, means constituting a biasing force applied to at least one of said movable members, one of said members being in the form of a metallic element subject to relative longitudinal extension and contraction under temperature changes to provide forces opposing said biasing force.

10. A mechanical movement as defined in claim 9 wherein said metallic element is in the form of a fine rod or wire.

11. A mechanical movement for control or regulation purposes comprising three elements having a shallow triangular arrangement, at least two of said elements being angularly movable to control or regulate, at least one of said elements being longitudinally extensible or contractible under conditions of control or regulation of an actuating force, means constituting a continuously acting biasing force applied to said triangular arrangement and tending to urge it into a shallower triangle and toward a common plane of said elements, and stop means to restrict the movements of said triangular arrangement to the approach side of said common plane of said elements wherein said biasing force on the triangular arrangement under certain conditions of control or regulation exceeds the resultant of the resisting forces and acceleration of movement of said triangular arrangement takes place as said stop means is approached, and when the resultant of the resisting forces exceed under certain conditions of control or regulation said biasing force the movement of said triangular arrangement is accelerated upon movement in the opposite direction relative to said stop means.

12. A three link obtuse angled linkage for control or regulation purposes having at least two of its links angularly movable to control or regulate, means constituting biasing force applied to said linage putting the longest link in tension loading and the shorter links in compression loading, stop means restricting the movements of said linkage, and one of said links being longitudinally extensible or contractible under directly applied forces of control or regulation.

13. A linkage as defined in claim 12 wherein said stop means is located in the path of movement of one of said links under certain conditions of said directly applied forces of control or regulation said biasing force exceeds opposing forces and moves said linkage with acceleration to said stop means and holds said linkage relative thereto, and also under certain conditions of said directly applied forces of control or regulation said opposing forces exceed said biasing force and move said linkage with acceleration in the opposite direction relative to said stop means.

14. A linkage as defined in claim 12 wherein said directly applied forces of control or regulation are thermal forces manifested by temperature changes in said one of said links.

15. A linkage as defined in claim 12 wherein said directly applied forces of control or regulation are physical forces manifested by changes in stress and strain in said one of said links.

16. A linkage as defined in claim 12 wherein said directly applied forces of control or regulation are hygroscopic forces manifested by changes of humidity in said one of said links.

17. A linkage as defined in claim 12 wherein said stop means restricts the application of said biasing force to said linkage.

References Cited in the file of this patent

UNITED STATES PATENTS

| 490,926 | Roberts | Jan. 31, 1893 |
| 2,240,192 | Meyer | Apr. 29, 1941 |
| 2,245,252 | Cleghorn | June 10, 1941 |
| 2,330,506 | Matthias | Sept. 28, 1943 |
| 2,344,390 | Cohen | Mar. 14, 1944 |
| 2,539,308 | Latour | Jan. 23, 1951 |
| 2,709,732 | Davis | May 31, 1955 |

FOREIGN PATENTS

| 926,977 | France | Apr. 28, 1947 |

OTHER REFERENCES

Product Engineering 1953 Annual Handbook, pp. F26–27.